United States Patent
Sannan et al.

(10) Patent No.: US 6,989,440 B2
(45) Date of Patent: Jan. 24, 2006

(54) PURIFIED CHITINS AND PRODUCTION PROCESS THEREOF

(75) Inventors: Takanori Sannan, Tokyo (JP); Shinya Tsuchida, Tokyo (JP); Satoru Yoshinaga, Tokyo (JP); Kazushige Ieda, Tokyo (JP); Mitsutaka Seki, Tokyo (JP)

(73) Assignee: Dainichiseika Color & Chemicals Mfg. Co., Ltd., Tokyo (JP)

( * ) Notice: Subject to any disclaimer, the term of this patent is extended or adjusted under 35 U.S.C. 154(b) by 6 days.

(21) Appl. No.: 10/107,144

(22) Filed: Mar. 28, 2002

(65) Prior Publication Data

US 2003/0045692 A1  Mar. 6, 2003

(30) Foreign Application Priority Data

Apr. 4, 2001 (JP) .............................. 2001-106418

(51) Int. Cl.
*C08B 37/08* (2006.01)

(52) U.S. Cl. ............... 536/20; 536/55.1; 536/55.2; 536/123.1; 536/124; 536/127

(58) Field of Classification Search ............... 536/20, 536/18, 124, 55.1, 55.2, 127, 123.1; 260/211
See application file for complete search history.

(56) References Cited

U.S. PATENT DOCUMENTS

| | | | | |
|---|---|---|---|---|
| 2,168,375 A | * | 6/1939 | Thor ......................... | 260/210 |
| 3,683,076 A | * | 8/1972 | Rovati et al. ............... | 514/62 |
| 3,862,122 A | * | 1/1975 | Peniston et al. ............ | 260/211 |
| 3,879,377 A | * | 4/1975 | Austin ....................... | 260/211 |
| 4,267,313 A | * | 5/1981 | Sannan et al. .............. | 536/18 |
| 5,093,489 A | * | 3/1992 | Diamantoglou ........... | 536/124 |
| 5,470,964 A | * | 11/1995 | Qin ........................... | 536/20 |
| 5,599,916 A | * | 2/1997 | Dutkiewicz et al. ....... | 536/20 |
| 5,622,834 A | * | 4/1997 | Vournakis et al. ......... | 435/84 |
| 5,696,246 A | * | 12/1997 | Schmidt et al. ........... | 536/18.5 |
| 5,874,551 A | * | 2/1999 | Glasser et al. ............. | 536/20 |
| 6,255,085 B1 | * | 7/2001 | Chen et al. ................ | 435/101 |

OTHER PUBLICATIONS

Stedman's Medical Dictionary, 25th edition, 1989, pp 884.*
Fereidoon Shahidi, Jozef Synowiecki J. Agri. Food Chem. 1991, vol. 39, pp. 1527-1532.*
Charles J. Brine, Paul R. Austin Comp. Biochem. Physiol. 1981, vol. 69B, pp. 283-286.*
Emil Fischer et al "Synthese des d-Glucosamins", Berichte, 1903, 36, pp 24-29.*
C. Juneau, et al., Allured's Cosmetics Toiletries Magazine, vol. 116, No. 8, pp. 73-80, "Chitosan in Cosmetics: Technical Aspects When Formulating", Aug. 2001 (p. 79 will be filed later).
Riccardo A.A. Muzzarelli, Chitin Handbook, (1997), pp. 47-60.
George A.F. Roberts, Chitin Chemistry, (1992). pp. 1-60.
E.G. Bligh, et al., A Rapid Method of Total LIPID Extraction and Purification, Canadian Journal of Biochemistry and Physiology, vol. 37, No. 8, Aug. 1959.

* cited by examiner

*Primary Examiner*—James O. Wilson
*Assistant Examiner*—Ganapathy Krishnan
(74) *Attorney, Agent, or Firm*—Oblon, Spivak, McClelland, Maier & Neustadt, P.C.

(57) ABSTRACT

A purified chitin has a total content of fatty acids and salts thereof not higher than 0.2 wt. % in terms of fatty acids. The purified chitin can be produced by washing a chitin with at least one solvent selected from the group consisting of organic solvent and water-containing organic solvents such that a total content of fatty acids and salts thereof is lowered at least to 0.2 wt. % in terms of fatty acids.

7 Claims, No Drawings

PURIFIED CHITINS AND PRODUCTION PROCESS THEREOF

This application claims the priority of Japanese patent application 2001-106418 filed Apr. 4, 2001, which is incorporated herein by reference.

BACKGROUND OF THE INVENTION a) Field of the Invention

This invention relates to a purified chitin which, when dissolved in water, provides an aqueous solution of the chitin, said solution having low turbidity and high transparency; and also a production process of the purified chitin. The aqueous solution can be an aqueous acidic solution. Throughout this specification, chitin, chitosan, chemically modified products (derivatives) thereof and degradation products thereof may be collectively called "a chitin". However, the expression "aqueous solution of a chitin" does not include "an aqueous solution of chitin" as chitin is soluble in neither water nor diluted acid.

b) Description of the Related Art

Chitin is a natural high molecular substance, which exists in the exoskeletons of crustaceans, the calcified internal shells of cuttlefishes, fungi and molds. Industrial production of chitin is actively performed these days. A large majority of its sources are the shells of crabs, lobsters and shrimps, and the shells of squillas and the calcified internal shells of cuttle fishes are also used for certain applications. In the sense of industrial sources, there is no source other than the those mentioned above.

Deacetylation of chitin obtained from such a source affords chitosan. Using both of them as starting materials, various derivatives thereof and their oligosaccharides and monosaccharides are produced. As mentioned above, it is the current circumstances that as industrial sources for chitins, the shells of crabs, lobsters and shrimps are primarily employed with limited use of the shells of squillas and the calcified internal shells of cuttle fishes. These marine organisms obviously contain fatty substances.

Main components of the exoskeletons of crabs, lobsters and shrimps are calcium carbonate, proteins and chitin, each of which also contains fatty substances as a trace component. No economical and appropriate solvent is, however, known for the dissolution of chitin upon isolation of chitin from these exoskeletons. As an industrial method for obtaining chitin from their exoskeletons, it is hence a current practice to make the calcium carbonate and proteins in the exoskeletons soluble in water and then to remove them from the exoskeletons to obtain chitin. Described specifically, the exoskeletons of crabs, lobsters or shrimps are immersed in a dilute aqueous alkaline solution and subsequent to heating, degraded proteins are washed off with water. Insoluble matter with chitin contained therein is immersed in a dilute aqueous solution of hydrochloric acid to convert calcium carbonate, which is still contained in the insoluble matter, into calcium chloride which is soluble in water. The insoluble matter is then washed with water to remove the calcium chloride, so that chitin is obtained as insoluble matter. In this process, the treatment with the dilute alkaline solution and the treatment with dilute hydrochloric acid may be reversed in sequence.

Chitin, which has been obtained as described above, can be deacetylated into chitosan by immersing it, either after drying or without drying, in a conc. aqueous solution of sodium hydroxide, said solution being of such a concentration as giving a concentration of 40 wt. % after the reaction, and then heating it there. When chitosan obtained as described above is dissolved in a dilute aqueous solution of acetic acid and the resulting solution is examined for turbidity, the turbidity substantially fluctuates depending on the kind, growing area and the like of its source. In this sense, industrially-available chitosan lacks uniformity in quality and therefore, involves a problem as an industrial product. Depending on the source, an aqueous solution of the resulting chitosan has substantial turbidity. Such chitosan cannot be used as a commercial product, and may have to be discarded in some instances.

Using the above-obtained chitin or chitosan as a starting material, low molecular weight chitin, low molecular weight chitosan, glucosamine, glucosamine hydrochloride, glucosamine sulfate, acetylglucosamine and the like can be obtained by subjecting it to chemical degradation such as acid hydrolysis or oxidative degradation or to enzymatic degradation with chitinase or chitosanase in water by conventionally-known methods.

Further, from reactions of chitin or chitosan with epichlorohydrin, ethylene oxide, propylene oxide, glycidol or the like, the corresponding hydroxyalkyl derivatives are available; from reactions with monochloroacetic acid, carboxymethyl derivatives are available; from reactions with succinic anhydride, carboxyacyl derivatives are available; from reactions with glycidyltrimethylammonium chloride, quaternary ammonium derivatives are available; and from reactions with carbon disulfide, xanthate derivatives are available, all by conventionally-known methods. From reactions of chitosan with organic acids such as acetic acid, lactic acid and pyrrolidonecarboxylic acid, the corresponding organic acid salts of chitosan are available. Furthermore, hydrolysis of the xanthate derivative of chitin or chitosan regenerates chitin or chitosan, and neutralization of an organic acid salt of chitosan regenerates chitosan.

Aqueous solutions of water-soluble derivatives or degradation products obtained from chitosan, which produces turbidity when formed into an aqueous solution as mentioned above, or chitin as its raw material are often turbid, and these turbid aqueous solutions of chitins are significantly reduced in commercial value and those having substantial turbidity can find no commercial value.

No report has been made to date on the essential cause of the above-described problem, to say nothing of its resolution method. It is the current circumstance that each manufacturer of a chitin is trying to deal with this problem of turbidity by carefully choosing for the chitin a source that is empirically considered to develop less turbidity. Keeping in step with the active use of chitins in recent years, especially with their increasing use in fine chemicals, there is a growing desire for the resolution of the problem of turbidity in aqueous solutions of the chitins.

SUMMARY OF THE INVENTION

An object of the present invention is, therefore, to ascertain the cause of the above-described turbidity in an aqueous solution of a chitin, and to provide a purified chitin capable of affording an aqueous solution of the chitin, said solution having low turbidity and high transparency, when dissolved in water or acidic water and also to provide a process for its production.

In an attempt to solve the above-described problem, the present inventors washed chitosan, which had been produced by the above-described conventional process, with isopropyl alcohol. The unwashed chitosan and the washed chitosan were dissolved in aliquots of a dilute solution of acetic acid, respectively, and the resulting solutions were compared in the degree of turbidity. As a result, it was found that the aqueous solution of the washed chitosan had much less turbidity. Chitosan was then subjected to extraction with isopropyl alcohol in a Soxhlet extractor, and impurities extracted in the isopropyl alcohol were analyzed by infrared spectroscopy, gas chromatography and other methods. Those extracted impurities were found to comprise palmitic acid and oleic acid as primary components and also to contain a small amount of fatty acids, such as stearic acid and myristic acid, and/or salts thereof.

The exoskeletons of crustaceans, industrial sources for chitin, inherently contain fatty substances or fatty acids in a certain amount or greater as mentioned above. The present inventors ascertained that, when a chitin is produced from such a source by a conventionally-known method, fatty acids and/or salts thereof remain in a certain amount or greater in the chitin as the final product and these remaining fatty acids and/or salts thereof are a primary cause of turbidity in an aqueous solution when the chitosan is formed into the aqueous solution.

In each of the current industrial production steps for obtaining chitin from the exoskeletons of crustaceans as a source and further chitosan from chitin, the treatment is conducted only with an aqueous solution of sodium hydroxide, hydrochloric acid or water. It had heretofore been believed that by this conventional process, fatty substances contained in the source are also degraded and those soluble in water are removed. No further special operation had been considered to be needed accordingly.

As a result of a detailed investigation by the present inventors, however, it was ascertained that fatty acids and/or salts thereof, water-insoluble substances, exist in chitin sources or degraded products of fatty substances existed in the chitin production steps and that these fatty acids and/or salts thereof remain in a significant amount in chitin or chitosan, which is also a water-insoluble substance, even after the removal of calcium carbonate and proteins from the chitin source.

Further, the fatty acids and/or salts thereof existed in the chitin source, chitin or chitosan are considered to remain in the final product without being removed in the production steps of the chitin. It had been ascertained from an analysis of the fatty acids and/or salts thereof that their principal components are water-insoluble salts such as the calcium salts of the fatty acids and the magnesium salts of the fatty acids. It had, accordingly, been found that these fatty acids and/or salts thereof, a cause for turbidity, can be removed from a chitin by washing the chitin with an organic solvent or a water-containing organic solvent.

On the other hand, the above-described organic solvent may not be used in many instances because of production facilities for the chitin or the application purpose of the product. An investigation was next conducted to develop a process which does not rely upon any organic solvent. As a result, it has been found the removal of the fatty acids and/or salts thereof can be achieved by washing the chitin in an alkaline state, in which ammonia or an alkali metal (for example, sodium or potassium) is contained, with decalcified water and/or calcium-sequestered in at least one of plural production steps of the chitin. Namely, it has been found that the fatty acids and/or salts thereof, which are contained in the chitin, are converted into hydrophilic ammonia or alkali metal salts thereof and are readily removed from the chitin by the washing with decalcified water or calcium-sequestered water.

The above-described object can be achieved by the present invention to be described hereinafter.

In one aspect of the present invention, there is thus provided a purified chitin having a total content of fatty acids and salts thereof not higher than 0.2 wt. % in terms of fatty acids. The purified chitin does not produce turbidity when dissolved in water, and has high quality.

Preferably, a source of the chitin is at least one source selected from the group consisting of lobsters, shrimps, crabs, squillas, krills and cuttle fishes. The fatty acids and salts thereof may comprise, for example, at least one fatty acid or a salt thereof selected from the group consisting of palmitic acid, oleic acid, stearic acid and myristic acid and salts thereof. The salts of the fatty acids may comprise, for example, at least one salt selected from the group consisting of calcium salts of the fatty acids and magnesium salts of the fatty acids. The chitin may be, for example, at least one chitin selected from the group consisting of chitin and chitosan, chemically modified products thereof and degraded products thereof.

The chemically modified products may preferably be acylated products, tosylated products, alkylated products, carboxylated products, sulfated products, phosphated products, nitrated products, carbamoylated products, thiocarbamoylated products, metal ion complexes, Schiff base complexes, quaternary ammonium salts, crosslinked products, xanthated products, salt-form derivatives, and regenerated products of xanthated products.

The chitin may preferably be at least one compound selected from the group consisting of glucosamine, glucosamine hydrochloride, glucosamine sulfate, acetylglucosamine, and oligosaccharides thereof.

The chitin may preferably contain, in a molecule thereof, at least one group selected from the group consisting of hydroxylalkyl groups, carboxyalkyl groups, carboxyacyl groups, hydroxyacyl groups, a sulfate group, a phosphate group and a quaternary ammonium group.

The chitin may preferably be chitosan having a purity such that an aqueous chitosan solution with the chitosan dissolved at a concentration of 0.5 wt. % in a 0.5 wt. % aqueous solution of acetic acid has a transparency of at least 20 as measured in accordance with the method described in "9. Clarity" of the Industrial Effluent Testing Method stipulated under K 0102 (1998) in Japanese Industrial Standards (JIS).

In another aspect of the present invention, there is also provided a process for the production of a purified chitin, which comprises washing a chitin with at least one solvent selected from the group consisting of organic solvent and water-containing organic solvents such that a total content of fatty acids and salts thereof is lowered at least to 0.2 wt. % in terms of fatty acids. The chitin may preferably be washed with at least one solvent selected from the group consisting of ethanol and isopropyl alcohol. This process is excellent, because its operation is simple, it can be widely applied, and it has high ability to remove the fatty acids and/or salts thereof in the chitin. As a result of an analysis of a chitin produced in accordance with the above process, the total content of fatty acids and salts thereof in the chitin was found to be 0.2 wt. % or lower. An aqueous solution of the chitin, as an industrial product, has high transparency and an extremely high commercial value. This supports the finding that the principal cause of turbidity in an aqueous solution of a chitin is fatty acids and/or salts thereof, especially water-insoluble salts such as the calcium salts of fatty acids and the magnesium salts of fatty acids. On the other hand, a chitin obtained by the prior art from a source which was not carefully selected contains approximately 0.5 wt. % or more of fatty acids and/or salts thereof. Even in the case of a chitin obtained from a carefully selected source, it contains fatty acids and/or salts thereof in an amount greater than 0.2 wt. % in terms of fatty acids. Irrespective of the source, the chitin available from the prior art cannot avoid the problem of turbidity when formed into an aqueous solution.

In a further aspect of the present invention, there is also provided a process for the production of a purified chitin through steps, which comprises conducting, in at least one of the steps, treatment with at least one of decalcified water and water sequestered with a calcium sequestering agent such that a total content of fatty acids and salts thereof in the chitin is lowered at least to 0.2 wt. % in terms of fatty acids. The calcium sequestering agent may preferably be disodium ethylenediaminetetraacetate.

In a still further aspect of the present invention, there is also provided a process for the production of a purified chitin, which comprises the following steps:

immersing a chitin in alkaline water with ammonia or an alkali metal contained therein, and collecting and washing the chitin, wherein in the washing step, washing the chitin, in an alkaline state with ammonia or the alkali metal contained therein, at least once with at least one of decalcified water and water sequestered with a calcium sequestering agent such that a total content of fatty acids and salts thereof in the chitin is lowered at least to 0.2 wt. % in terms of fatty acids.

In a still further aspect of the present invention, there is also provided a process for the production of a purified chitin, which comprises the following steps:

immersing chitin in a conc. aqueous alkaline solution to deacetylate the chitin into chitosan, and collecting and washing the chitosan, wherein in the washing step, washing the chitosan, in an alkaline state with ammonia or the alkali metal contained therein, at least once with at least one of decalcified water and water sequestered with a calcium sequestering agent such that a total content of fatty acids and salts thereof in the chitosan is lowered at least to 0.2 wt. % in terms of fatty acids.

The decalcified water may preferably be at least one decalcified water selected from the group consisting of distilled water, desalinated water and deionized water.

Use of decalcified water is most advantageous in that different from use of an organic solvent or calcium sequestered water, there is absolutely no need to worry about the organic solvent or a calcium sequestering agent which may remain in the resulting chitin. Use of calcium sequestered water, on the other hand, is advantageous in that different from use of decalcified water, a special apparatus for obtaining decalcified water, such as a desalinating apparatus or a deionized water production apparatus, is not required and conventional chitin production facilities can be used.

DETAILED DESCRIPTION OF THE INVENTION AND PREFERRED EMBODIMENTS

The present invention will next be described in further detail based on preferred embodiments. A description will firstly be made about extraction and removal of fatty acids and/or salts thereof from a chitin by using an organic solvent which may contain water. The object of the present invention can be readily achieved by washing the chitin with the organic solvent.

This washing with the organic solvent can be applied to any conventionally known step for the production of a chitin. No particular conditions are imposed on the washing method or the like. For example, fatty acids and/or salts thereof can be extracted and removed from a chitin into an organic solvent by a Soxhlet extractor. As a simpler procedure, fatty acids and/or salts therefore can be fully removed from a chitin by simply immersing the chitin in an organic solvent, causing the fatty acids and/or salt thereof to be dissolved out into the organic solvent and collecting the chitin by filtration. According to this washing with the organic solvent, the fatty acids and/or salts thereof are all dissolved into the organic solvent and can be easily extracted and removed from the chitin.

Illustrative of the organic solvent for use in the above-described procedure are alcohols such as methanol, ethanol and 2-propanol; ketones such as acetone and methyl ethyl ketone; esters such as ethyl acetate and methyl acetate; hydrocarbons such as hexane, heptane, benzene and toluene; halogenated hydrocarbons such as dichloroethane, dichloromethane and trichloroethylene; ethers such as diethyl ether, dioxane and tetrahydrofuran; glymes such as ethylene glycol monomethyl ether and ethylene glycol monomethyl ether acetate; diglymes such as diethylene glycol monomethyl ether; and aprotonic polar solvents such as dimethylformamide and dimethylacetamide.

Upon selection of an organic solvent, any solvent can be selected insofar as it does not dissolve the chitin to be washed. Alcohols are, however, preferred for their handling ease and economy. In particular, an aqueous solution containing 30 wt. % or more of ethanol or 2-propanol is preferred from the standpoint of safety and economy. As water for the aqueous solution, ordinary tap water, industrial water or underground water can be used.

In each of the invention processes making no use of an organic solvent, washing of a chitin in an alkaline state, in which ammonia or an alkali-metal-containing alkaline substance is contained, with decalcified water and/or calcium sequestered water is conducted at least once in at least one of steps for the production of the chitin. Examples of the decalcified water can include distilled water, deionized water and desalinated water. Conditioning of the chitin in the alkaline state with ammonia or the alkali-metal-containing alkaline substance converts the fatty acids and/or salt thereof, which are contained in the chitin, into ammonium or alkali metal salts having high hydrophilicity, so that the ammonium or alkali metal salts can be easily removed when washed with the decalcified water and/or calcium sequestered water.

Decalcified water may be used as water throughout the production steps of the chitin. It is, however, sufficient if decalcified water is used only for washing a wet chitin in an alkaline state with ammonia or an alkali-metal-containing alkaline substance subsequent to removal of both proteins and calcium carbonate from a chitin source by a conventional process. Upon washing, a calcium sequestering agent may also be used in combination with decalcified water as needed. Upon immersing the chitin in the alkaline water with ammonia or the alkali metal contained therein such that the chitin is brought into an alkaline state, the alkaline water may be used in such an amount as required to submerge the chitin in its entirety in the alkaline water, or preferably as required to permit agitation. When the chitin in the alkaline state is washed, on the other hand, it is effective to wash the wet chitin repeatedly at least twice with decalcified water in an amount limited to that minimally necessary. No particular limitation is imposed on the washing temperature.

After the chitin, from which fatty acids and/or salts thereof have been removed, is deacetylated into chitosan by immersing it in the conc. aqueous alkaline solution in the production step of chitin as described above, it is unnecessary to use decalcified water for washing chitosan. Ordinary tap water, industrial water or underground water can be used. When chitin is purchased from a supplier or the like, it is possible to subject the chitin to decalcification treatment again with dilute hydrochloric acid and then to conduct treatment in a similar manner as in the case of the above-described wet chitin. In this case, the decalcification treatment with dilute hydrochloric acid is not absolutely required. It is, however, more effective to conduct the decalcification treatment. Incidentally, no particular limitation is imposed on the conc. aqueous alkaline solution insofar as the deacetylation is feasible. Illustrative of the conc. aqueous alkaline solution is a 45 wt. % aqueous solution of sodium hydroxide. The deacetylation may preferably be conducted under heating, for example, at 60° C.

In the present invention, calcium sequestered water can be used in place of the above-described decalcified water. When calcium sequestered water is used, it is not essential to bring the chitin into an alkaline state with alkaline water, which contains ammonia or an alkali-metal-containing alkaline substance, before the treatment, although it is preferred to bring the chitin into an alkaline state as described above. Examples of the calcium sequestering agent used in the calcium sequestered water can include chelating agents of the aminocarboxylic acid type, such as ethylenediaminetetraacetic acid, hydroxyethylethylenediaminetriacetic acid, dihydroxyethylethylenediaminediacetic acid, 1,3-propanediaminetetraacetic acid, diethylenetriaminepentacetic acid, triethylenetetraminehexaacetic acid, nitrilotriacetic acid, hydroxyethyliminodiacetic acid, and salts thereof; chelating agents of the hydroxyaminocarboxylic acid type, such as that obtained by adding aminocarboxylic acid to ethyl α-(hydroxymethyl)acrylate; chelating agents of the amino acid type, such as methylglycinediacetic acid, L-glutamic acid diacetic acid, L-aspartic acid diacetic acid, and salts thereof; chelating agents of the condensed phosphoric acid type, such as pyrophosphoric acid, metaphosphoric acid, polyphosphoric acid, tripolyphosphoric acid, and salts thereof; chelating agents of the oxycarboxylic acid type, such as citric acid, tartaric acid, gluconic acid, and salts thereof; acetylacetone; acid zeolite and sodium zeolite. Needless to say, the calcium sequestering agent is not limited to the above-exemplified calcium sequestering agents insofar as it is possible to inhibit fatty acids from being formed into water-insoluble salts such as the calcium salts or magnesium salts. Among these exemplified calcium sequestering agents, disodium ethylenediaminetetraacetate is preferred from the standpoint of calcium sequestering ability.

Here again, calcium sequestered water may be used as water throughout the production steps of the chitin. The object of the present invention can, however, be achieved sufficient if calcium sequestered water is used only for washing a wet chitin subsequent to removal of both proteins and calcium carbonate from a chitin source. Upon washing, decalcified water may also be used in combination with calcium sequestered water as needed.

The amount of the calcium sequestering agent to be used varies depending on the amount of the calcium salts of fatty acids still remaining in the chitin. In general, however, the calcium sequestering agent may be used, as a standard, in an amount as much as 1.2 times or greater, preferably about 2.0 times in equivalent the amount of calcium ions contained in water into which the calcium sequestering agent is to be dissolved.

When washing the chitin with the calcium sequestered water, water with the calcium sequestering agent dissolved therein maybe prepared beforehand; or as an alternative, water free of the calcium sequestering agent is added in an amount as much as needed to the chitin, followed by the addition of the calcium sequestering agent in an amount as much as needed, or vice versa. It is effective to use the calcium sequestered water or the water free of the calcium sequestering agent in such an amount as required to submerge the chitin in its entirety in the water, or preferably as required to permit agitation and to wash the chitin repeatedly at least twice with the calcium sequestered water in an amount limited to that minimally necessary. No particular limitation is imposed on the washing temperature.

When chitin is purchased from a supplier or the like, it is possible to subject the chitin to decalcification treatment again with dilute hydrochloric acid and then to treat it with calcium sequestered water in a similar manner as in the case of the above-described wet chitin. In this case, the decalcification treatment with dilute hydrochloric acid is not absolutely required. It is, however, more effective to conduct the decalcification treatment. When chitin is purchased from a supplier or the like and is then converted into chitosan, it is effective to wash the chitosan with calcium sequestered water subsequent to deacetylation of the chitin. The deacetylation in this case can be conducted in a similar manner as described above.

When washing the chitosan with the calcium sequestered water, water with the calcium sequestering agent dissolved therein may be prepared beforehand; or as an alternative, water free of the calcium sequestering agent is added in an amount as much as needed to the chitosan, followed by the addition of the calcium sequestering agent in an amount as much as needed, or vice versa. It is effective to use the calcium sequestered water or the water free of the calcium sequestering agent in such an amount as required to submerge the chitosan in its entirety in the water, or preferably as required to permit agitation and to wash the chitosan repeatedly at least three times with the calcium sequestered water in an amount limited to that minimally necessary. No particular limitation is imposed on the washing temperature.

Whichever process is used out of the above-described processes, the present invention makes it possible to obtain a chitin with a total content of fatty acids and salts thereof lowered at least to 0.2 wt. % in terms of fatty acids. Each chitin, which has a total content of fatty acids and salts thereof not higher than 0.2 wt. % in terms of fatty acids and is soluble in water, can provide an aqueous solution the transparency of which is high enough to permit its use or supply as an industrial product, so that the aqueous solution is provide with a significantly improved commercial value. Chitins are used not only in the form of aqueous solutions but are also used abundantly in other forms. For applications in such other forms, chitins each of which has a total content of fatty acids and salts thereof not higher than 0.2 wt. % in terms of fatty acids are obviously high in commercial value.

The present invention will hereinafter be described more specifically on the basis of Referential Examples and Examples.

REFERENTIAL EXAMPLE 1

Dried shells (100 parts by weight) of swimming crabs from Southeast Asia were agitated as crab shells at 30° C. for 2 hours in a 4 wt. % aqueous solution of hydrochloric acid (800 parts by weight) to have calcium carbonate in the crab shells dissolved as calcium chloride. The solid matter was collected by filtration, and washed with underground water to conduct decalcification treatment. The filtration residue, which contained chitin, was then agitated at 75° C. for 2 hours in a 2 wt. % aqueous solution of sodium hydroxide (800 parts by weight) to conduct deproteinization treatment. The residue was collected by filtration, and washed with underground water to obtain chitin as the filtration residue. The chitin was then placed in a 45 wt. % aqueous solution of sodium hydroxide (600 parts by weight), and agitated under heating at 60° C. for 16 hours to conduct deacetylation treatment. The solid matter was collected by filtration, washed with underground water and then dried to obtain chitosan (25 parts by weight).

EXAMPLE 1

Purified chitosan was obtained in a similar manner as in Referential Example 1 except that instead of the washing with the underground water subsequent to the deacetylation of the chitin alkalinized with sodium hydroxide, chitosan was washed three times with a 0.1 wt. % aqueous solution of EDTA.

EXAMPLE 2

Purified chitosan was obtained in a similar manner as in Referential Example 1 except that instead of the washing with the underground water subsequent to the deproteinization treatment of the crab shells alkalinized with sodium hydroxide, chitin was washed three times with a 0.1 wt. % aqueous solution of EDTA.

EXAMPLE 3

Purified chitosan was obtained in a similar manner as in Referential Example 1 except that instead of the washing with the underground water subsequent to the deproteinization treatment of the crab shells alkalinized with sodium hydroxide, chitin was washed once with a 0.1 wt. % aqueous solution of EDTA.

EXAMPLE 4

Purified chitosan was obtained in a similar manner as in Referential Example 1 except that instead of the washing with the underground water subsequent to the deproteinization treatment of the crab shells alkalinized with sodium hydroxide, chitin was washed three times with deionized water and instead of the washing with the underground water subsequent to the deacetylation of the chitin alkalinized with sodium hydroxide, chitosan was washed four times with deionized water.

EXAMPLE 5

Purified chitosan was obtained in a similar manner as in Referential Example 1 except that instead of the washing with the underground water subsequent to the deproteinization treatment of the crab shells alkalinized with sodium hydroxide, chitin was three times with deionized water.

EXAMPLE 6

Purified chitosan was obtained in a similar manner as in Referential Example 1 except that the dry chitosan was washed once with a 30 wt. % aqueous solution of isopropyl alcohol.

[Measurements of the Transparencies of Aqueous Solutions of Chitosan Samples and the Contents of Fatty Acids in the Chitosan Samples]

The transparencies of aqueous solutions of the chitosan sample of Referential Example 1 and the six (6) samples of purified chitosan of Examples 1–6 and the contents of fatty acids in the chitosan sample and purified chitosan samples were measured by the below-described methods. The results will be shown subsequently in Table 1.

<Measuring Method of Transparency>

(1) Preparation of Sample Solutions

The chitosan sample of Referential Example 1 and the six samples of purified chitosan of Examples 1–6 were separately dissolved at a concentration of 0.5 wt. % in aliquots of a 0.5 wt. % aqueous solution of acetic acid to obtain seven aqueous chitosan solutions. After those seven aqueous chitosan solutions were left over for 24 hours, they were provided for transparency measurements.

(2) Measuring Method

The transparencies of the seven aqueous chitosan solutions were measured in accordance with the method described in "9. Clarity" of the Industrial Effluent Testing Method stipulated under K 0102 (1998) in Japanese Industrial Standards (JIS).

<Measuring Method of Content of Fatty Acids>

(1) Preparation of Analysis Samples

The chitosan sample of Referential Example 1 and the six samples of purified chitosan of Examples 1–6 were used as analysis samples. Aliquots (5.0 g) of those seven samples (5.0 g in terms of pure chitosan in view of contained water) were weighed in seven extraction thimbles, respectively. Those seven extraction thimbles were all plugged with absorbent cotton.

(2) Measuring Method

The plugged extraction thimble with 5.0 g of the chitosan sample of Referential Example 1 weighed therein was set in an extracting section of a Soxhlet extractor. Distilled water (50 mL) was poured in the extracting section. The extraction thimble was left over for 30 minutes to soak the sample in the water such that the sample was caused to swell. Isopropyl alcohol (65 mL), distilled water (15 mL) and five boiling bubble stones were placed in a flat bottom flask arranged in a lower section of the Soxhlet extractor. Thirty minutes later, the water in the extracting section of the Soxhlet extractor was transferred to the flat bottom flask in the lower section, and extraction was conducted for 2 hours in the Soxhlet extractor. Subsequent to the extraction, a solution remaining in the extracting section of the Soxhlet extractor was transferred to the flat bottom flask in the lower section to combine all extracts in the flat bottom flask. The extract so combined was transferred to a round bottom flask. To suppress bubbling of the solution, acetic acid (3 to 4 droplets) were added to the flask as needed, and the flask was connected to an evaporator to concentrate the extract to about 1 to 2 mL. A 5% aqueous solution of acetic acid (50 mL) was added to the concentrate. Deposits on an inner wall of the flask were caused to separate in an ultrasonic bath, and were dispersed and deflocculated in the aqueous solution of acetic acid. Hexane (50 mL) was added to the flask, the resulting mixture was shaken thoroughly on a shaker to extract the fatty acids from the extract into the hexane layer, and the hexane layer was separated. Providing the separated hexane layer as a sample solution for analysis by gas chromatography, the amount of fatty acids in the chitosan was measured using the standard fatty acids solution described below under (3) and the system and conditions described below under (4). The contents of fatty acids in the purified chitosan samples of Examples 1–6 were also measured likewise.

(3) Preparation of Standard Fatty Acids Solution

As myristic acid, palmitic acid, oleic acid and stearic acid, reagents (purity: 98% or higher) were used, respectively. They were separately dissolved in aliquots of hexane to prepare four 0.1 W/V % solutions. Using those solutions as stocks, they were diluted stepwise to prepare standard solutions of 5 to 200 ppm concentrations. Those standard solutions were injected at a rate of 2 μL/solution into a gas chromatographic analysis system to prepare calibration lines. The analysis sample solutions, which had been prepared above for the measurement of transparencies under (1), were separately injected into the gas chromatographic analysis system, and analyzed. Based on the calibration lines, the concentrations of the fatty acids in the respective samples were calculated.

(4) Gas Chromatographic Analysis System and Operating Conditions

| | |
|---|---|
| Main system: | "GC-14A", trade name, manufactured by Shimadzu Corporation |
| Column: | "G-100", Chemicals Inspection and Testing Institute, Japan |
| Detector: | FID |
| Carrier gas: | Helium, 30 mL/min |
| Column temperature: | 120° C. to 280° C., 6° C./min |
| Injection temperature: | 280° C. |
| Detector temperature: | 280° C. |
| Sample size: | 2.0 μL |

TABLE 1

| | | Ref. Ex. | Examples | | | | | |
|---|---|---|---|---|---|---|---|---|
| | | 1 | 1 | 2 | 3 | 4 | 5 | 6 |
| Transparency | | 5 | 23 | >50 | 33 | 22 | 21 | 21 |
| Contents of fatty acids (%) | MA | 0.03 | <0.01 | <0.01 | <0.01 | <0.0 | <0.01 | <0.01 |
| | PA | 0.20 | 0.08 | 0.01 | 0.02 | 0.09 | 0.08 | 0.07 |
| | OA | 0.26 | 0.08 | 0.01 | 0.05 | 0.05 | 0.08 | 0.07 |
| | SA | 0.04 | 0.02 | 0.01 | 0.03 | 0.03 | 0.02 | 0.02 |
| Total | | 0.53 | 0.18 | 0.03 | 0.10 | 0.17 | 0.18 | 0.17 |

MA: myristic acid, PA: palmitic acid, OA: oleic acid, SA: stearic acid

As is understood from Table 1, the transparency of the aqueous solution of the chitosan of Referential Example 1 was 5 and the total content of the fatty acids in the chitosan of Referential Example 1 was 0.53 wt. % in terms of fatty acids, whereas the transparencies of the aqueous solutions of the purified chitosan samples of Examples 1–6 were all higher than 20 and the total contents of the fatty acids in the chitosan samples of Examples 1–6 were all lower than 0.20 wt. % in terms of fatty acids. The transparencies and contents of fatty acids to be shown in Table 2 and Table 3 were measured by the same methods.

REFERENTIAL EXAMPLE 2

Decalcification treatment and deproteinization treatment were conducted as in Referential Example 1. The resulting chitin was collected by filtration, washed with underground water, and then dried to obtain dry chitin (100 parts by weight). The chitin was then placed in a 45 wt. % aqueous solution of sodium hydroxide (300 parts by weight), and agitated under heating at 60° C. for 16 hours to conduct deacetylation treatment. The solid matter was collected by filtration, washed with underground water and then dried to obtain dry chitosan (90 parts by weight).

EXAMPLE 7

Purified chitosan was obtained in a similar manner as in Referential Example 2 except that instead of the washing with the underground water subsequent to the deacetylation of the dry chitin alkalinized with sodium hydroxide, chitosan was washed three times with a 0.1 wt. % aqueous solution of EDTA.

EXAMPLE 8

Purified chitosan was obtained in a similar manner as in Referential Example 2 except that instead of the washing with the underground water subsequent to the deacetylation of the dry chitin alkalinized with sodium hydroxide, chitosan was washed three times with deionized water.

EXAMPLE 9

Purified chitosan was obtained in a similar manner as in Referential Example 2 except that the dry chitin was washed three times with a 0.1 wt. % aqueous solution of EDTA before the deacetylation.

EXAMPLE 10

Purified chitosan was obtained in a similar manner as in Referential Example 2 except that the dry chitin alkalinized with sodium hydroxide was washed once with a 30 wt. % aqueous solution of isopropyl alcohol before the deacetylation.

EXAMPLE 11

Purified chitosan was obtained in a similar manner as in Referential Example 2 except that the dry chitosan alkalinized with sodium hydroxide was washed three times with a 0.1 wt. % aqueous solution of EDTA.

EXAMPLE 12

Purified chitosan was obtained in a similar manner as in Referential Example 2 except that the dry chitosan was washed once with a 30 wt. % aqueous solution of isopropyl alcohol.

TABLE 2

|  |  | Ref. Ex. | Examples | | | | | |
|---|---|---|---|---|---|---|---|---|
|  |  | 2 | 7 | 8 | 9 | 10 | 11 | 12 |
| Transparency | | 5 | 22 | 20 | 22 | 21 | 20 | 21 |
| Contents | MA | 0.03 | <0.01 | <0.01 | <0.01 | <0.01 | <0.01 | <0.0 |
| of fatty | PA | 0.20 | 0.09 | 0.09 | 0.08 | 0.09 | 0.09 | 0.09 |
| acids (%) | OA | 0.26 | 0.05 | 0.06 | 0.08 | 0.06 | 0.06 | 0.06 |
|  | SA | 0.04 | 0.03 | 0.03 | 0.02 | 0.03 | 0.03 | 0.03 |
|  | Total | 0.53 | 0.17 | 0.18 | 0.18 | 0.18 | 0.19 | 0.18 |

As is understood from Table 2, the transparency of the aqueous solution of the chitosan of Referential Example 2 was 5 and the total content of the fatty acids in the chitosan of Referential Example 2 was 0.53 wt. % in terms of fatty acids, whereas the transparencies of the aqueous solutions of the purified chitosan samples of Examples 7–12 were all 20 or higher and the total contents of the fatty acids in the chitosan samples of Examples 7–12 were all lower than 0.20 wt. % in terms of fatty acids.

REFERENTIAL EXAMPLE 13

The chitosan (100 parts by weight) of Referential Example 1 and tap water (900 parts by weight) were charged in an autoclave. Propylene oxide (200 parts by weight) was added, followed by the further addition of a 48 wt. % aqueous solution of sodium hydroxide. After the resultant mixture was stirred at 70° C. under 3 kg/cm² for 2 hours, propylene oxide (200 parts by weight) was added and further, a 48 wt. % aqueous solution of sodium hydroxide (0.5 parts by weight) was added. The resulting mixture was stirred at 70° C. under 3 kg/cm² for 2 hours.

The thus-obtained aqueous solution was added dropwise into a large excess of boiling water to precipitate hydroxypropylchitosan. The precipitate was repeatedly subjected to hot filtration and hot water washing, and the finally obtained hydroxypropylchitosan was lyophilized. The lyophilized product was dissolved in purified water to obtain a 0.7 wt. % aqueous solution (A). A similar procedure was conducted on the purified chitosan of Example 1, and the lyophilized product was dissolved in purified water to prepare a 0.7 wt. % aqueous solution (B). In addition, the lyophilized product of hydroxypropylchitosan obtained from the chitosan of Referential Example 1 was washed with acetone and dried again. Using the hydroxypropylchitosan so obtained, a 0.7 wt. % aqueous solution (C) was also obtained. Twenty-four hours later, the transparencies of the respective aqueous solutions were measured, and the contents of fatty acids in the respective lyophilized hydroxypropylchitosan products were also measured. The results are shown in Table 3.

TABLE 3

| Solution | | A | B | C |
|---|---|---|---|---|
| Transparency | | 10 | 40 | >50 |
| Contents of | MA | 0.02 | <0.01 | <0.01 |
| fatty acids | PA | 0.20 | 0.05 | <0.01 |
| (%) | OA | 0.20 | 0.03 | <0.01 |
|  | SA | 0.03 | <0.01 | <0.01 |
|  | Total | 0.45 | 0.08 | 0.01 |

As is understood from Table 3, the hydroxypropylchitosan prepared from the chitosan of Referential Example 1 had a total content of fatty acids as high as 0.45 wt. % in terms of fatty acids and therefore, the transparency of the aqueous solution (A) was as low as 10. In contrast, the hydroxypropylchitosan prepared from the purified chitosan of Example 1 had a total content of fatty acids as low as 0.08 wt. % in terms of fatty acids and therefore, the transparency of the aqueous solution (B) was as high as 40 and was improved in commercial value. Further, the purified hydroxypropylchitosan obtained by washing with acetone the hydroxypropylchitosan prepared from the chitosan of Referential Example 1 had a lowest total content of fatty acids of 0.1 wt. %, and its aqueous solution (C) had a transparency higher than 50 and was a very clear aqueous solution.

We claim:

1. A purified chitin having a total content of fatty acids and salts thereof not higher than 0.2 wt. % in terms of fatty acids, wherein the chitin is a chemically modified chitin, chitosan, chemically modified chitosan, decomposition product of chitin, or decomposition product of chitosan wherein the said decomposition is carried out by acid hydrolysis or oxidation or by enzyme and the fatty acids are free fatty acids, metal ion salts of free fatty acids, calcium salt of free fatty acid, or magnesium salt of free fatty acid, wherein said fatty acids and salts thereof comprise at least one fatty acid or a salt thereof selected from the group consisting of palmitic acid, oleic acid, stearic acid and myristic acid and salts thereof; and wherein the purified chitin is not D-glucosamine, wherein said chitin is chitosan having a purity such that an aqueous chitosan solution with said chitosan dissolved at a concentration of 0.5 wt. % in a 0.5 wt. % aqueous solution of acetic acid has a transparency of at least 20 as measured in accordance with the method described in "9 Clarity" of the Industrial Effluent Testing Method stipulated under K 0102 (1998) in Japanese Industrial Standards (JIS).

2. A process for the production of a purified chitin, which comprises treating with water sequestered with a calcium sequestering agent such that a total content of fatty acids and salts thereof in said chitin is lowered at least to 0.2 wt. % in terms of fatty acids.

3. A process according to claim 2, wherein said calcium sequestering agent is disodium ethylenediaminetetraacetate.

4. A process for the production of a purified chitin, which comprises:
   immersing a chitin in alkaline water with ammonia or an alkali metal contained therein, and
   collecting and washing said chitin,
   wherein in said washing step, washing said chitin, in an alkaline state with ammonia or said alkali metal contained therein, at least once with water sequestered with a calcium sequestering agent such that a total content of fatty acids and salts thereof in said chitin is lowered at least to 0.2 wt. % in terms of fatty acids.

5. A process for the production of a purified chitin, which comprises:
  immersing chitin in a concentrated aqueous alkaline solution to deacetylate said chitin into chitosan, and collecting and washing said chitosan,
  wherein in said washing step, washing said chitosan, in an alkaline state with ammonia or said alkali metal contained therein, at least once with water sequestered with a calcium sequestering agent such that a total content of fatty acids and salts thereof in said chitosan is lowered at least to 0.2 wt. % in terms of fatty acids.

6. A process according to claim 3, which further comprises treating with at least one decalcified water selected from the group consisting of distilled water, desalinated water and deionized water.

7. A process according to claim 4, which further comprises treating with at least one decalcified water selected from the group consisting of distilled water, desalinated water and deionized water.

* * * * *